(12) United States Patent
Amend et al.

(10) Patent No.: US 11,374,896 B2
(45) Date of Patent: Jun. 28, 2022

(54) DOMAIN NAME REQUEST MULTIPLICATION FOR MULTIPATH-ACCESS

(71) Applicant: Deutsche Telekom AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/367,446

(22) Filed: Jul. 5, 2021

(65) Prior Publication Data

US 2022/0014494 A1 Jan. 13, 2022

(30) Foreign Application Priority Data

Jul. 7, 2020 (EP) ..................................... 20184590

(51) Int. Cl.
*H04L 29/12* (2006.01)
*H04L 29/08* (2006.01)
*H04L 61/10* (2022.01)
*H04L 61/5007* (2022.01)

(52) U.S. Cl.
CPC .......... *H04L 61/10* (2013.01); *H04L 61/2007* (2013.01)

(58) Field of Classification Search
CPC ............................ H04L 61/10; H04L 61/2007
See application file for complete search history.

(56) References Cited

U.S. PATENT DOCUMENTS

| 7,426,576 | B1 | 9/2008 | Banga et al. |
| 2003/0172127 | A1* | 9/2003 | Northrup ............... G06Q 10/10 709/219 |
| 2012/0124239 | A1 | 5/2012 | Shribman et al. |
| 2016/0301590 | A1* | 10/2016 | He ...................... H04L 12/6418 |

(Continued)

FOREIGN PATENT DOCUMENTS

WO WO-2017220149 A1 * 12/2017

OTHER PUBLICATIONS

David G. Andersen, et al., "Improving Web Availability for Clients with MONET", http://nms.lcs.mit.edu/ron/ronweb/, May 4, 2005, pp. 1-14, USENIX, The Advanced Computing Systems Association, Berkley, USA, XP061012378.

(Continued)

*Primary Examiner* — Christopher B Robinson
(74) *Attorney, Agent, or Firm* — Leydig, Voit & Mayer, Ltd.

(57) ABSTRACT

A method for domain name resolution includes: requesting, by an access device, via a resolving request, an IP address based on a present domain name or a domain name based on a present IP address, wherein the access device is configured to have multipath access to a data network via at least two access paths; generating, by the access device, an initial domain name query based on the resolving request; duplicating, by the access device, the initial domain name query into at least two multiplied domain name queries; sending, by the access device, each of the at least two multiplied domain name queries to a respective name server; and receiving, by the access device, a domain name response comprising the requested IP address or the requested domain name from each respective name server.

13 Claims, 2 Drawing Sheets

(56) References Cited

U.S. PATENT DOCUMENTS

2017/0104717 A1* 4/2017 Vesterinen ............ H04W 40/02
2018/0152545 A1* 5/2018 Steiner ................ H04L 67/1014

OTHER PUBLICATIONS

T. Savolainen, et al., "improved Recursive DNS Server Selection for Multi-Interfaced Nodes", Standards Track, Dec. 19, 2012, pp. 1-29, Internet Engineering Task Force, Fremont, USA, XP015086513.

* cited by examiner

DOMAIN NAME REQUEST MULTIPLICATION FOR MULTIPATH-ACCESS

CROSS-REFERENCE TO PRIOR APPLICATIONS

Priority is claimed to European Patent Application No. EP 20 184 590.6, filed on Jul. 7, 2020, the entire disclosure of which is hereby incorporated by reference herein.

FIELD

This invention relates to a method for domain name resolution of an access device that is configured to have a multipath-access via at least two access paths to a data network. In addition, this invention relates to an access device for domain name resolution, wherein the access device is configured to have a multipath-access via at least two access paths to a data network. Furthermore, this invention relates to a system for domain name resolution. Moreover, this invention relates to a computer product for domain name resolution.

BACKGROUND

Internet network operators typically provide one or several access paths for customers such as fixed path (e.g. Digital Subscriber Line (DSL)), Wireless Local Area Network (WLAN) (e.g., Wi-Fi via a public hotspot), or cellular (e.g. 2G to 5G). Even if those customers own a user equipment (UE) like a smartphone, which are potentially capable of connecting to multiple accesses simultaneously, they don't make use of them due to lack of multi-connectivity technologies. In particular for smartphones, a simultaneous connectivity to Wi-Fi and cellular network is common, while applications are stuck to one access path unable to benefit from a second available access path in terms of reliability and speed.

Even though network protocols like Multipath Transmission Control Protocol (MPTCP), Multipath Quick UDP Internet Connection (MP-QUIC), Multipath Datagram Congestion Control Protocol (MPDCCP) and Stream Control Transmission Protocol (SCTP) could leverage the potential of multiple accesses, they are not widely adopted and require usually an end-to-end implementation. multipath connectivity architectures like 3GPP Access Traffic Steering Switching and Splitting (ATSSS) manages simultaneous connectivity for UEs over cellular (3GPP access) and non-cellular access (untrusted non-3GPP access e.g. Wi-Fi).

For domain name resolution, which means the resolution of a requested IP address on the basis of a present domain name or a requested domain name on the basis of a present IP address, an access device sends a Domain Name System (DNS) request to a name server (NS), which contains a mapping between IP addresses and corresponding domain addresses. In the above described multipath-access scenario the domain name resolution by the user equipment is usually bounded to a preferred name server and possibly additional lower priority name servers, wherein the user equipment sends a single DNS request over one access path at a time. When the user equipment knows multiple name servers, such as a name server of a multipath connectivity network provider, a name server predefined in the operating system (e.g. Google 8.8.8.8), a name server defined by the cellular network operator and a name server defined by the Wi-Fi network operator, it sends a single DNS request over on access path solely with a predefined prioritization. With regard to multipath access operation, that provides the following issues:

First, the sequential querying of one name server at a time can lead to extra delay when other name servers can response faster.

Second, it could be that multiple name server hold different information on a query and only one or a selection is valid, which may lead to conflicts in the determination of the most suitable requested IP address or requested domain name.

Third, a single DNS request over one access path solely, breaks the concept of multipath access when it promises to provide more reliability.

SUMMARY

In an exemplary embodiment, the present invention provides a method for domain name resolution. The method includes: requesting, by an access device, via a resolving request, an IP address based on a present domain name or a domain name based on a present IP address, wherein the access device is configured to have multipath access to a data network via at least two access paths; generating, by the access device, an initial domain name query based on the resolving request; duplicating, by the access device, the initial domain name query into at least two multiplied domain name queries; sending, by the access device, each of the at least two multiplied domain name queries to a respective name server; and receiving, by the access device, a domain name response comprising the requested IP address or the requested domain name from each respective name server.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
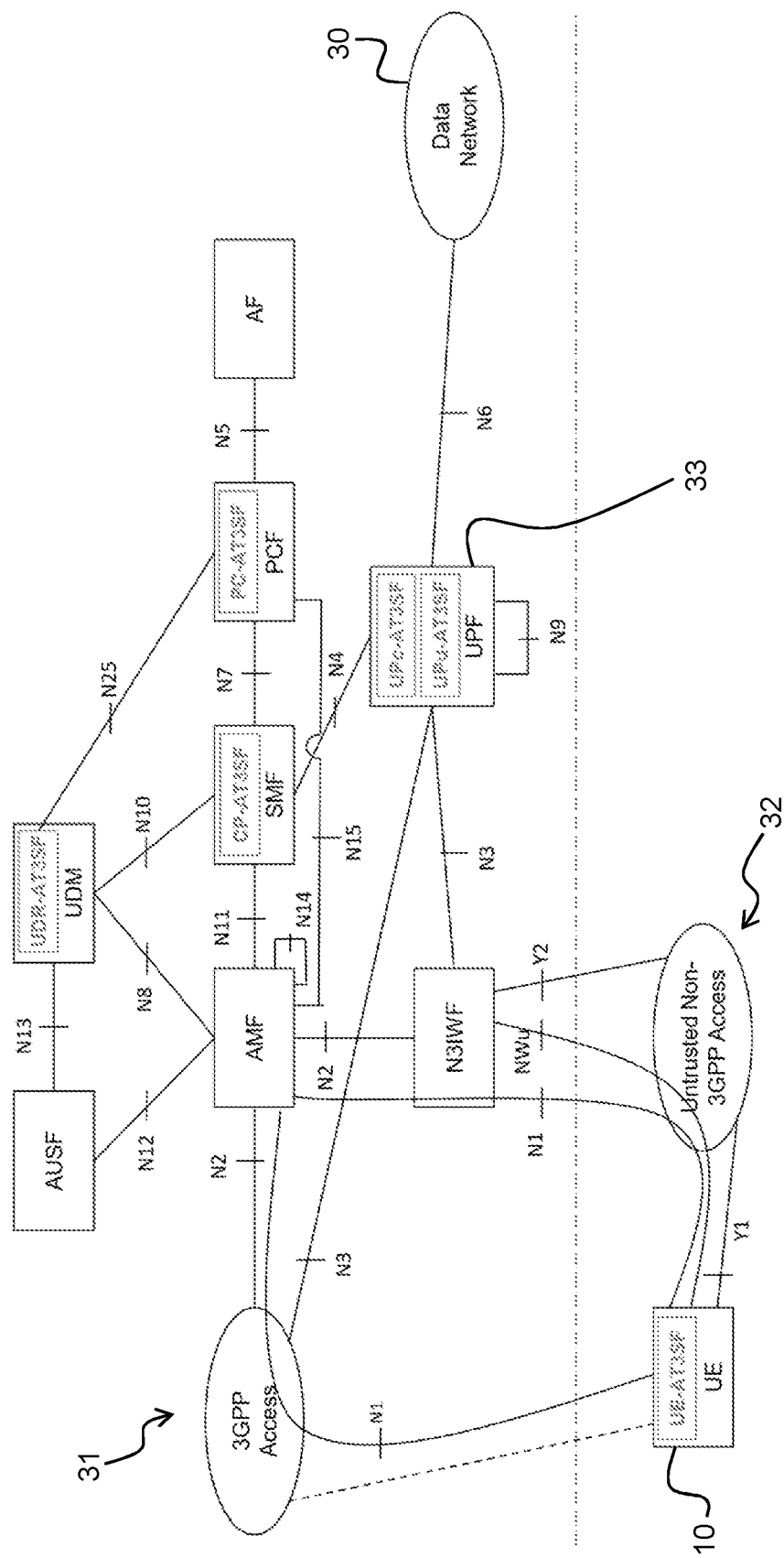
FIG. 1 shows a schematic drawing of a 3GPP ATSSS architecture as example of a multi connectivity network/architecture.

Exemplary embodiments of the present invention provide a method for domain name resolution with a faster response time, better efficiency, higher reliability and improved accessibility. In addition, exemplary embodiments of the invention provide an access device, which is suitable to perform the access device related method steps. Furthermore, exemplary embodiments of the invention provide a system, which is suitable to perform the method. Moreover, exemplary embodiments of the invention provide a program product for domain name resolution, which when executed by the access device, causes access device to perform the access device related method steps.

In an exemplary embodiment, a method comprises the following steps:
- a resolving request step, wherein an application of the access device requests a requested IP address on the basis of a present domain name or requests a requested domain name on the basis of a present IP address by a resolving request;
- a domain name system query step, wherein a resolver generates an initial domain name query on the basis of the resolving request;
- a multiplication step, wherein a multiplicator duplicates the initial domain name query into at least two multiplied domain name queries, wherein each is sent by the access device to a name server;
- a response step, wherein each name server that receives the multiplied domain name query sends a domain name response a to the access device comprising the requested IP address or the requested domain name; and
- a receiving step, wherein the access device receives the domain name responses.

A starting point of the method for domain name resolution is the resolving request by the application of the access device to the resolver, wherein it for example demands the requested IP address on the basis of the present domain name. On the basis of the resolving request the resolver generates an initial domain name query, which corresponds to a DNS request that could be sent to a respective name server. The initial domain name query is duplicated by the multiplicator within the multiplication step leading to at least two multiplied domain name queries. The domain name queries are sent by the access device to at least one name server. A name server that receives a respective domain name query sends a corresponding domain name response to the access device comprising the requested IP address or the requested domain name. Preferably, the access device is a home gateway, a router or a user equipment, wherein a user equipment is preferably a smartphone, a tablet, a laptop or a PC.

The sending of multiple multiplied domain name queries has the advantage that the access device receives multiple domain name responses from different name servers and/or via different access paths, which may have different response times and/or different information. Choosing the fastest domain name response leads to a minimum delay. In addition, the receiving of multiple domain name responses within the same request step makes it possible to identify different received response information or conflicts more comprehensively and faster.

According to a preferred aspect of the invention each multiplied domain name query is sent by the access device to its respective name server(s). For example, a first multiplied domain name query is sent to a name server defined by the cellular network operator, whereas a second domain name query is sent to a name server defined by the Wi-Fi network operator. Each name server that receives its respective domain name query sends a domain name response to the access device comprising the requested IP address or the requested domain name. For example, the name server defined by the cellular network operator and the name server defined by the Wi-Fi network operator sent each their domain name response with the requested IP address back to the access device. Sending the multiplied domain name queries to its respective name servers has the advantage that the access device receives multiple domain name responses from different name servers having different response times and/or information.

According to a preferred aspect of the invention the multiplied domain name queries are sent to the name servers via different access paths. For example, the first multiplied domain name query is sent via a first access path to the name server predefined in the operating system, whereas the second multiplied domain name query is sent via a second access path to said name server predefined in the operating system. In another example, the first multiplied domain name request is sent via a first access path to the name server defined by the cellular network operator, whereas the second multiplied domain name request is sent via a second access pass to the name server defined by the Wi-Fi network operator. In another exemplary scenario with three multiplied domain name requests and two access paths, two multiplied domain name requests are sent via one access pass, whereas one multiplied domain name request is sent via the other access pass. The usage of different access paths for the multiplied domain name requests has the advantage that a temporarily non-availability of at least one of the access paths could be compensated. By doing so the reliability is significantly improved. In particular, due to the different coverage of the different access paths the accessibility is also improved.

Preferably, the domain name responses of the name servers are sent via different access paths. For example, the first domain name response of the name server defined by cellular network operator is sent back via the first access path, whereas the second domain name response of so name server defined by the Wi-Fi network operator is sent via the second access path. The usage of different access paths for the domain name responses leads again to the significantly improved reliability and accessibility.

According to a preferred aspect of the invention the multiple access paths are fixed, preferably Digital Subscriber Line (DSL), or Wireless Local Area Network (WLAN), or cellular, preferably 2G, 3G, 4G or 5G. By using different access technologies for the multiplied domain name queries the different characteristics of the technologies be combined in a complementary way. Advantageously, the reliability and the accessibility is improved, in particular for a mobile access device. For the example, the first multiplied domain name request is sent via a cellular access path (e.g. 5G) to the name server defined by the cellular network operator, whereas the second multiplied domain name request is sent via a WLAN access path or a Wi-Fi access path to the name server defined by the Wi-Fi network operator.

According to a preferred aspect of the invention the method comprises a selection step, in which a selector of the access device selects from the domain name responses received by the access device a selected response, which is forwarded by the resolver to the application. The selection step is preferably using defined criteria for the selection of the forwarded domain name request.

According to a preferred aspect of the invention the selected response corresponds to the domain name response, which is received first by the access device. By choosing the first received domain name request the delay for the domain name resolution is advantageously reduced, in particular since multiple name servers are requested.

According to a preferred aspect of the invention the selector comprises a decision logic that only considers those domain name responses received within a defined time frame, in particular before one defined time threshold. In this way, only domain name responses within the defined timeframe could be forwarded to the application. The definition of a defined upper time threshold has the advantage that the delay for the response is reduced because the resolver does not wait until getting all responses.

According to a preferred aspect of the invention the selector comprises a decision logic that weights the name servers. Preferably, the name servers known to the access devices have a different priority and the logic chooses from the received domain name responses the name server with the highest priority. In particular, the name servers are listed in descending order and the logic chooses from the received domain name responses the domain name response with the highest number/position. In particular, the weighting is only applied for domain name responses received within a defined timeframe. Preferably, the weighting could also be performed on the basis of defined criteria, wherein the additional information such as location, access speed, provider identification and/or security information that is comprised in the domain name responses 4a, 4b is considered by the decision logic.

According to a preferred aspect of the invention a resolution function of the application that triggers the domain name resolution is modified to implement the multiplication step by creating the at least two domain name queries. The modification of those functions has the advantage that the applications, which uses these functions, don't need to be modified in order to implement the invention. The modification is only performed on the function itself. Preferably, the resolution function is the gethostbyname-function and/or the gethostbyaddress-function defined by the Portable Operating System Interface (POSIX) standard family. Within POSIX the gethostbyname-function triggers the resolving of a requested IP address on the basis of a present domain name, whereas the gethostbyaddress-function triggers the resolving of the requested domain name on the basis of the present IP address. By the modification of those standardized POSIX functions the invention could be implemented for a large number of applications.

According to a preferred aspect of the invention the resolution functions name gets a new name, preferably it is extended with a suffix, and a new resolution function with a new logic uses the resolution function's name, in particular wherein the new resolution function uses the resolution function with the new name. In this way, an application, which uses the resolution function's name (e.g. gethostbyname) could remain unchanged, whereas the new resolution function uses the functionality of the resolution function under a new name. Advantageously, the invention could be implemented efficiently with minor changes in the program code.

Preferably, the code of the new gethostbyname-function has the following command lines in order to implement the invention:

```
gethostbyname (...) {
    for x in (#NS) {
        res[x] = gethostbyname_old(... (, interface))
    }
    respond = selection_logic(res)
    return respond
}
```

The suffix "_old" is added to the original gethostbyname-function and the renamed original gethostbyname-function is used within the new gethostbyname-function for a defined number of name servers #NS, wherein a response res[x] is received for each name server x. The for-loop basically corresponds to the multiplicator, wherein multiple multiplied domain name queries are sent to different name servers, wherein they are optionally indicated with a defined interface. Depending on the selection_logic function a certain response is forwarded/returned to the application that uses the new gethostbyname-function by using the gethostbyname-function command.

A new gethostbyaddress-function is used in a similar way in order to implement the invention for a resolution of a requested domain name on the basis of a present IP address. Preferably, the code of the gethostbyaddress-function has the following command lines in order to implement the invention:

```
gethostbyaddress (...) {
    for x in (#NS) {
        res[x] = gethostbyaddress_old(... (, interface))
    }
    respond = selection_logic(res)
    return respond
}
```

According to a preferred aspect the multiplied domain name queries are sent with a transmission protocol that supports multiple access paths in combination with a redundant scheduler, in order to send the multiplied domain name queries from the access device to the respective name servers. Preferably, a Multipath Transmission Control Protocol (MPTCP) is used as the transmission protocol of the multiplied domain name queries. Instead of the commonly used Hypertext Transfer Protocol Secure (HTTPS), Transmission Control Protocol (TCP), or User Datagram Protocol (UDP), a transmission protocol that supports multiple access path is used to allow the transmission of a domain name query via different access path. By combination with a so-called redundant scheduler at least two of the multiplied domain name queries are transmitted via different access paths. One advantage is that the reliability and accessibility is improved.

In an exemplary embodiment, the present invention provides an access device for domain name resolution, wherein the access device is configured to have a multipath-access via at least two access paths to a data network comprising:
  an application that is configured to request a requested IP address on the basis of a present domain name or to request a requested domain name on the basis of a present IP address by a resolving request,
  a resolver that is configured to generate an initial domain query on the basis of the resolving request, and
  a multiplicator that is configured to duplicate the initial domain name query into at least two multiplied domain name queries,
  wherein the access device is configured to send each of the multiplied domain name queries to its respective name server and to receive a domain name response from each respective name server.

This access device is configured to perform the method steps of the above described method, which relate to the access device. In particular, the access device is configured for the generation and sending of at least two multiplied domain name queries to its respective name servers and to receive the domain name responses from the name servers.

According to a preferred aspect of the invention the access device comprises a selector that is configured to select from the received responses a selected response, which is forwarded by the resolver to the application. Preferably a logic is used for the selection of the selected response in order to obtain the requested IP address or requested domain name in an optimal way.

In an exemplary embodiment, the invention provides a system for domain name resolution that comprises an access device described above and at least two name servers, wherein each name server is configured to receive the respective multiplied domain name query and to send the domain name response to the access device comprising the requested IP address or the requested domain name.

This system is configured to perform the method steps of the above described method. In particular, the access device is configured to send each of the at least two multiplied domain name requests to its respective name servers and the name servers are configured to send the domain name responses to the access device.

In an exemplary embodiment, the invention provides a computer program product for domain name resolution which, when executed by an access device, causes the access device to perform the resolving request step, the domain name system query step, the multiplication step, the receiving step and preferably the selection step.

Below, features of the invention are explained by way of a preferred embodiment. The present disclosure is not limited to the specifically named combinations of features. Rather, the features mentioned here can be combined in different ways in different embodiments, unless expressly excluded.

FIG. 1 shows an exemplary multi connectivity network/architecture according to the invention as an ATSSS architecture as defined by the 3GPP TS 23.501. The ATSSS manages simultaneous connectivity for an access device 10, here user equipment (UE), over a first access path 31, here a cellular (3GPP access) and a second access path 32, here non-cellular access (Untrusted Non-3GPP access, e.g. Wi-Fi). As shown in FIG. 1, the access device 10 connects to a data network 30 over cellular (first access path 31, 3GPP Access) and Wi-Fi (second access path 32, Untrusted Non-3GPP access) using the N3 interface towards the ATSSS-UPF (User Plane Function) part of a 5G core. The untrusted non-3GPP access path is interconnected with the 5G core through the non-3GPP Interworking entity/function (N3IWF), which is responsible to attach the non-3GPP access to the 5G core. The UPF can be understood as an interface between access device 10 and data network 30 (e.g. Internet) taking responsibility for traffic management. Within the 3GPP ATSSS architecture the first access path 31 (3GPP Access), the second access path 32 (Untrusted Non-3GPP access) and the termination point, here UPF, which corresponds to a multi connectivity operator 33, form a multipath connectivity network that provides the multipath access of the access device 10 to the data network 30.

Other elements/functions forming part of the 5G core as shown in FIG. 1 are: Authentication Server Function (AUSF), Unified Data Management (UDM), Access and Mobility Management Function (AMF), Session Management Function (SMF), Policy Control Function (PCF) and Application Function (AF) including the control plane and user plane. In addition, FIG. 1 also shows the name of the interfaces that are exposed by each of these elements.

Figure 2:
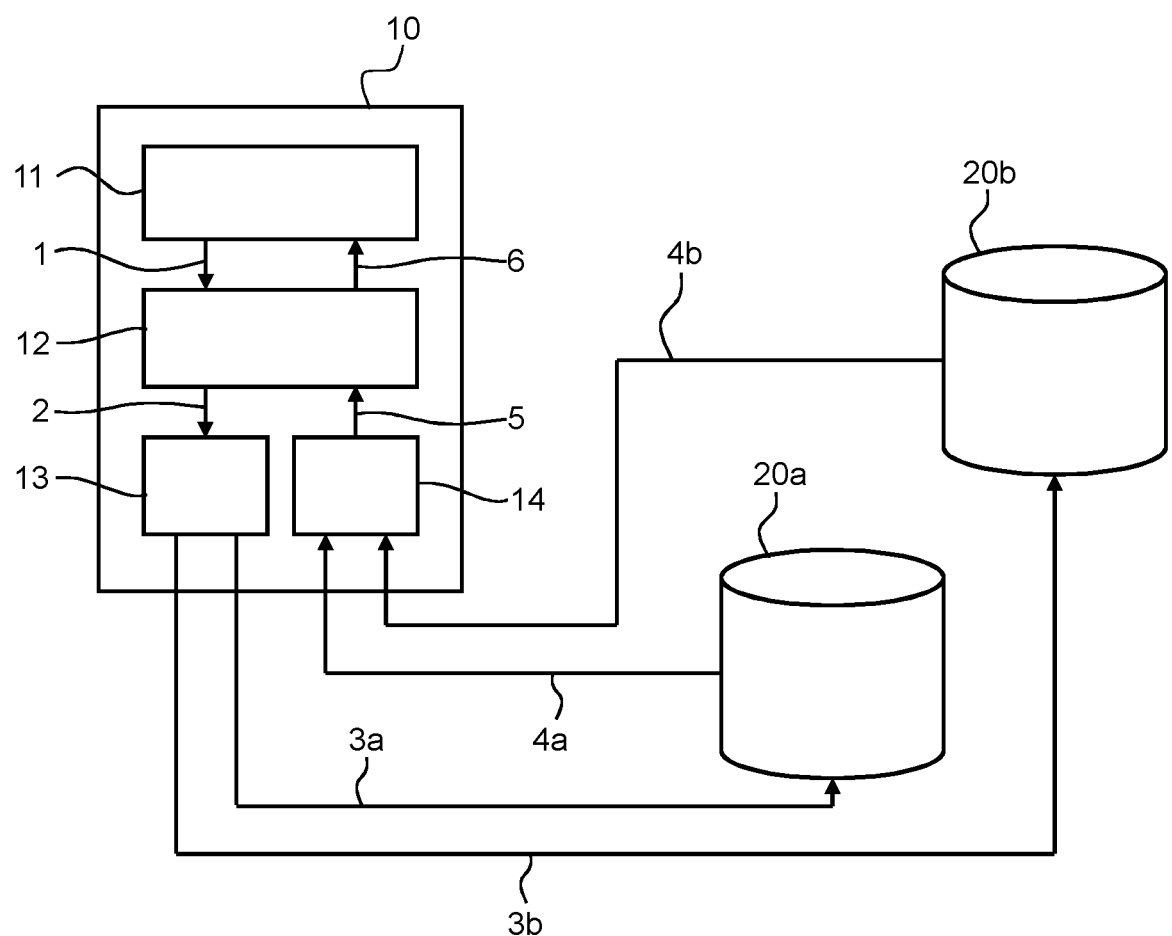
FIG. 2 shows a schematic drawing of a system comprising an access device and two name servers according to an embodiment of the invention.

FIG. 2 shows a schematic drawing of a system comprising an access device 10 and two name servers, namely the first name server 20a and second name server 20b. The access device 10 is preferably a home gateway, a router or a user equipment, wherein the user equipment is for example a tablet, a smartphone, or a PC, configured to have a multipath-access via at least two access paths to a data network. The access device 10 comprises an application 11, a resolver 12, a multiplicator 13 and preferably a selector 14. These functional elements are preferably implemented by computer programs that can be executed on the access device 10 and/or by suitably configured electronic components, such as electronic chips. The name servers 20a, 20b are DNS servers, which contain a mapping between an IP address and a corresponding domain name address, in addition they also contain other information related to the IP address such as location, access speed, provider identification, security information and the like.

The application 11 of the access device 10 demands or requests a requested IP address on the basis of a present domain name (e.g. www.example.com) or a requested domain name on the basis of a present IP address (e.g. 123.45.67.89) by a resolving request 1 within a resolving request step 100. On the basis of the resolving request 1 the resolver 12 generates an initial domain name query 2 within a domain name system query step 101, wherein the initial domain name query 2 corresponds to a DNS request. The multiplicator 13 duplicates or multiplies the initial domain name query 2 into two multiplied domain name queries, namely a first domain name query 3a and a second domain name query 3b. The first domain name query 3a is sent to the first name server 20a, which receives the query and sends a first domain name response 4a back to the access device 10. The second domain name query 3b is sent to the second name server 20b, which receives the query and sends the second domain name response 4b back to the access device 10. Both domain name responses 4a, 4b comprise the requested IP address or the requested domain name, and they may comprise additional information about the requested IP address or the requested domain name, for example location, access speed, provider identification and/or security information.

To improve the reliability of the domain name resolution the multiplied domain name queries 3a, 3b are sent via different access paths 31, 32 from the access device 10 to their respective name servers 20a, 20b and/or the domain name responses 4a, 4b are sent via different access path 31, 32 from the name servers 20a, 20b to the access device 10. For example, the first multiplied domain name query 3a and the first domain name response 4a are exchanged via a cellular access path 31 (e.g. 5G) between the access device 10 and the name server 20a defined by the cellular network operator, whereas the second multiplied domain name query 3b and the second domain name response 4b are exchanged via a Wireless Local Area Network (WLAN) access path or Wi-Fi access path 32 between the access device 10 and the name server 20b defined by the Wi-Fi network operator.

The domain name responses 4a, 4b are received by the access device 10. From the received domain name responses 4a, 4b the selector 14 selects a selected response 5 that is forwarded to the resolver 12 within a selection step 105. In a first elementary embodiment of the invention the selected response 5 corresponds to the first received domain name response 4a or 4b so that basically no selection from the group of the received domain name responses is performed. In a second embodiment the selector 14 comprises a decision logic, which only considers domain name responses 4a, 4b received within defined timeframe. Preferably, this time frame is only defined by one time threshold so that only those received domain name responses 4a, 4b are considered, which have been received before the time threshold. Alternatively or cumulatively, the decision logic weights the name servers 20a, 20b. This weighting could for example be performed based on a predefined priority list of the name servers 20a, 20b known by the access device 10. This weighting could also be performed on the basis of defined criteria, wherein the additional information (location, access speed, provider identification and/or security information) comprised in the domain name responses 4a, 4b is considered. For example, the selected response 5 contains a requested IP address of a preferred area/country. In this way the access device 10 or the user of the access device has more flexibility to choose a preferred requested IP address or requested domain name. The selected domain name response 5 is forwarded by the resolver 12 to the application 11 as a forwarded domain name response 6, wherein the application 11 uses the requested IP address or requested domain name for further execution of the application 11.

Figure 3:
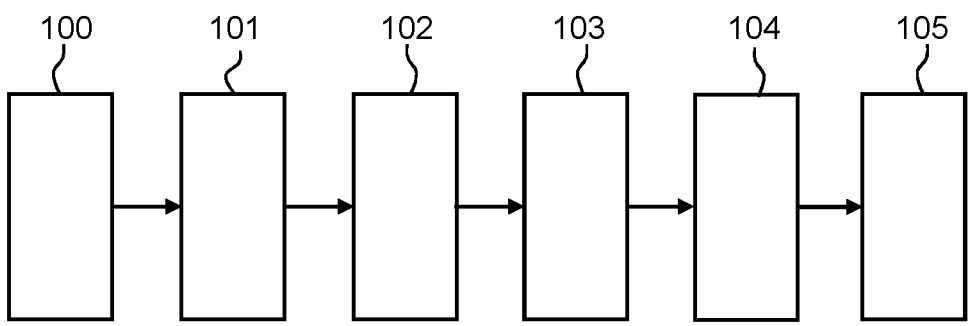
FIG. 3 shows a flowchart according to an embodiment of the invention.

FIG. 3 shows the performed method steps in a flowchart. The method starts with the resolving request step 100, wherein the application 11 requests a requested IP address or requested domain name with the resolving request 1. Within the domain name query step 101 the initial domain name query 2 is generated based on the resolving request. The initial domain name query 2 is duplicated or multiplied in the multiplication step 102. Within the response step 103 the name servers 20a, 20b send the domain name responses 4a, 4b to the access device 10. The access device 10 receives the domain name responses 4a, 4b in the receiving step 104. Preferably, the selection step 105 is performed, wherein from the received domain name responses 4a, 4b a preferred selected domain name response 5 is selected.

The access device 10 is configured to perform the resolving request step 100, the domain name query step 101, the multiplication step 102, the receiving step 104 and preferably the selection step 105, whereas the response step 103 is performed by the at least two name servers 20a, 20b. The steps may be performed according to execution of a computer program product.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES 1 resolving request
2 initial domain name query
3a first multiplied domain name query
3b second multiplied domain name query
4a first domain name response
4b second domain name response
5 selected domain name response
6 forwarded domain name response
10 user equipment
11 application
12 resolver
13 multiplicator
14 selector
20a first name server
20b second name server
30 data network, e.g. Internet
31 first access path/3GPP Access
32 second access path/Untrusted Non-3GPP Access
33 multi connectivity operator/User Plane Function, UPF
100 resolving request step
101 domain name system query step
102 multiplication step
103 response step
104 receiving step
105 selection step

The invention claimed is:

1. A method for domain name resolution for an access device having multipath access to a data network via at least two access paths, comprising:
   generating, by the access device, an initial domain name query based on a resolving request from an application of the access device, wherein the resolving request requests an IP address based on a present domain name or a domain name based on a present IP address;
   duplicating, by the access device, the initial domain name query into at least two duplicated domain name queries;
   sending, by the access device, the at least two duplicated domain name queries to a plurality of name servers via different access paths, wherein each of the at least two duplicated domain name queries is sent to a respective name server of the plurality of name servers, and wherein each of the plurality of name servers corresponds to a different access technology; and
   receiving, by the access device, domain name responses comprising the requested IP address or the requested domain name from the plurality of name servers via different access paths, wherein each domain name response is received from a respective name server of the plurality of name servers.

2. The method according to claim 1, wherein the at least two access paths include a fixed access path, a wireless local area network (WLAN) access path, or a cellular access path.

3. The method according to claim 1, further comprising:
   selecting, by the access device, from the domain name responses received by the access device, a selected response.

4. The method according to claim 3, wherein the selected response corresponds to the domain name response which is received first by the access device.

5. The method according to claim 3, wherein the selection only considers domain name responses received within a defined time frame.

6. The method according to claim 3, wherein the selection is based on a weighting of the name servers.

7. The method according to claim 1, wherein the duplication is performed using a modified version of the gethostbyname-function defined by the Portable Operating System Interface (POSIX) standard family or a modified version of the gethostbyaddress-function defined by the POSIX standard family.

8. The method according to claim 7, wherein:
the modified version of the gethostbyname-function uses the original name of the gethostbyname-function, and the original gethostbyname-function uses a new name; or
the modified version of the gethostbyaddress-function uses the original name of the gethostbyaddress-function, and the original gethostbyaddress-function uses a new name.

9. The method according to claim 1, wherein the Multipath Transmission Control Protocol (MPTCP) is used in combination with a redundant scheduler in order to send the at least two duplicated domain name queries from the access device to the plurality of name servers.

10. An access device, comprising a processor and a non-transitory memory having processor-executable instructions stored thereon, wherein the processor is configured to execute the processor-executable instructions to facilitate the following being performed by the access device:
generating an initial domain name query based on a resolving request from an application of the access device, wherein the resolving request requests an IP address based on a present domain name or a domain name based on a present IP address;
duplicating the initial domain name query into at least two duplicated domain name queries;
sending the at least two duplicated domain name queries to a plurality of name servers via different access paths, wherein each of the at least two duplicated domain name queries is sent to a respective name server of the plurality of name servers, and wherein each of the plurality of name servers corresponds to a different access technology; and
receiving domain name responses from the plurality of name servers via different access paths, wherein each domain name response is received from a respective name server of the plurality of name servers.

11. The access device according to claim 10, wherein the processor is further configured to execute the processor-executable instructions to facilitate the following being performed by the access device:
selecting, from the received domain name responses, a selected response.

12. A system, comprising:
an access device; and
a plurality of name servers;
wherein the access device is configured to:
generate an initial domain name query based on a resolving request from an application of the access device, wherein the resolving request requests an IP address based on a present domain name or a domain name based on a present IP address;
duplicate the initial domain name query into at least two duplicated domain name queries;
send the at least two duplicated domain name queries to a plurality of name servers via different access paths, wherein each of the at least two duplicated domain name queries is sent to a respective name server of the plurality of name servers; and
receive domain name responses comprising the requested IP address or the requested domain name from the plurality of name servers via different access paths, wherein each domain name response is received from a respective name server of the plurality of name servers;
wherein each name server of the plurality of name servers is configured to receive a respective multiplied domain name query and to send a respective domain name response to the access device.

13. A non-transitory computer-readable medium having processor-executable instructions for domain name resolution, wherein the processor-executable instructions, when executed, facilitate performance of a method for domain name resolution according to claim 1.

* * * * *